US011295372B2

(12) United States Patent
Gordon et al.

(10) Patent No.: US 11,295,372 B2
(45) Date of Patent: *Apr. 5, 2022

(54) DIRECTING MOVEMENT OF A SELF-DRIVING VEHICLE BASED ON SALES ACTIVITY (71) Applicant: International Business Machines Corporation, Armonk, NY (US)

(72) Inventors: Michael S. Gordon, Yorktown Heights, NY (US); James R. Kozloski, New Fairfield, CT (US); Ashish Kundu, Elmsford, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 159 days.

This patent is subject to a terminal disclaimer.

(21) Appl. No.: 16/812,128

(22) Filed: Mar. 6, 2020

(65) Prior Publication Data
US 2020/0211095 A1 Jul. 2, 2020

Related U.S. Application Data (63) Continuation of application No. 15/162,920, filed on May 24, 2016, now Pat. No. 10,685,391.

(51) Int. Cl.
G06Q 30/06 (2012.01)
G05D 1/00 (2006.01)
(Continued)

(52) U.S. Cl.
CPC ..... G06Q 30/0639 (2013.01); G01C 21/3438 (2013.01); G05D 1/0011 (2013.01);
(Continued)

(58) Field of Classification Search
CPC ............... G06Q 30/0639; G06Q 50/30; G06Q 20/3224; G06Q 20/20; G01C 21/3438; G05D 1/0088; G05D 1/0011
(Continued)

(56) References Cited

U.S. PATENT DOCUMENTS 4,665,395 A 5/1987 Van Ness
4,908,988 A 3/1990 Yamamura
(Continued)

FOREIGN PATENT DOCUMENTS

CN 2349068 Y 11/1999
CN 201004265 Y 1/2008
(Continued)

OTHER PUBLICATIONS

Wang, Amy X. "Self-Driving Cars Could Spell the End of the Taxi Industry. Is That A Good Thing?" Inc.com, Inc., Jul. 8, 2015, <www.inc.com/slate/amy-x-wang-self-driving-cars-could-spell-the-end-of-taxi-industry.html.> (Year: 2015).*
(Continued)

Primary Examiner — Rupangini Singh
Assistant Examiner — Manal A. Alsamiri
(74) Attorney, Agent, or Firm — Law Office of Jim Boice (57) ABSTRACT A method, system, and/or computer program product controls a self-driving vehicle (SDV) based on a purchase transaction at a point of sale (POS) device. One or more processors detects a purchase transaction at a device for a product. In response to detecting the purchase transaction at the POS device, the processors(s) transmits instructions to the SDV to transport a passenger associated with the purchase transaction from a location of the POS device to a predetermined location.

5 Claims, 7 Drawing Sheets (51) Int. Cl.
*G01C 21/34* (2006.01)
*G06Q 20/20* (2012.01)
*G06Q 20/32* (2012.01)
*G06Q 50/30* (2012.01)

(52) U.S. Cl.
CPC .......... *G05D 1/0088* (2013.01); *G06Q 20/20* (2013.01); *G06Q 20/3224* (2013.01); *G06Q 50/30* (2013.01)

(58) Field of Classification Search
USPC ....................................................... 705/330
See application file for complete search history.

(56) References Cited

U.S. PATENT DOCUMENTS

| | | | |
|---|---|---|---|
| 5,975,791 | A | 11/1999 | McCulloch |
| 6,326,903 | B1 | 12/2001 | Gross |
| 6,393,362 | B1 | 5/2002 | Burns |
| 6,502,035 | B2 | 12/2002 | Levine |
| 6,587,043 | B1 | 7/2003 | Kramer |
| 6,622,082 | B1 | 9/2003 | Schmidt |
| 6,731,202 | B1 | 5/2004 | Klaus |
| 6,810,312 | B2 | 10/2004 | Jammu |
| 7,113,864 | B2 * | 9/2006 | Smith .................. G06Q 10/025 701/117 |
| 7,124,088 | B2 | 10/2006 | Bauer |
| 7,580,782 | B2 | 8/2009 | Breed |
| 7,769,544 | B2 | 8/2010 | Blesener |
| 7,877,269 | B2 | 1/2011 | Bauer |
| 7,979,173 | B2 | 7/2011 | Breed |
| 8,045,455 | B1 | 10/2011 | Agronow |
| 8,078,349 | B1 | 12/2011 | Prada Gomez |
| 8,140,358 | B1 | 3/2012 | Ling |
| 8,146,703 | B2 | 4/2012 | Baumann |
| 8,152,325 | B2 | 4/2012 | Mcdermott |
| 8,346,480 | B2 | 1/2013 | Trepagnier |
| 8,352,112 | B2 | 1/2013 | Mudalige |
| 8,442,854 | B2 | 5/2013 | Lawton |
| 8,466,807 | B2 | 6/2013 | Mudalige |
| 8,583,365 | B2 | 11/2013 | Jang |
| 8,660,734 | B2 | 2/2014 | Zhu |
| 8,676,466 | B2 | 3/2014 | Mudalige |
| 8,678,701 | B1 | 3/2014 | Aldasem |
| 8,786,461 | B1 | 7/2014 | Daudelin |
| 8,810,392 | B1 | 8/2014 | Teller |
| 8,816,857 | B2 | 8/2014 | Nordin |
| 8,874,305 | B2 | 10/2014 | Dolgov |
| 8,880,270 | B1 | 11/2014 | Ferguson |
| 8,892,451 | B2 | 11/2014 | Everett |
| 8,903,591 | B1 | 12/2014 | Ferguson |
| 8,923,890 | B1 | 12/2014 | White |
| 8,924,150 | B2 | 12/2014 | Tsimhoni |
| 8,935,034 | B1 | 1/2015 | Zhu |
| 8,949,016 | B1 | 2/2015 | Ferguson |
| 8,954,252 | B1 | 2/2015 | Urmson |
| 8,958,943 | B2 | 2/2015 | Bertosa |
| 8,965,621 | B1 | 2/2015 | Urmson |
| 8,970,362 | B2 | 3/2015 | Morley |
| 8,983,705 | B2 | 3/2015 | Zhu |
| 9,024,787 | B2 | 5/2015 | Alshinnawi |
| 9,123,049 | B2 | 9/2015 | Hyde |
| 9,170,327 | B2 | 10/2015 | Choe |
| 9,189,897 | B1 | 11/2015 | Stenneth |
| 9,194,168 | B1 | 11/2015 | Lu |
| 9,216,745 | B2 | 12/2015 | Beardsley |
| 9,286,520 | B1 | 3/2016 | Lo |
| 9,317,033 | B2 | 4/2016 | Ibanez-Guzman |
| 9,381,915 | B1 | 7/2016 | Crombez |
| 9,390,451 | B1 | 7/2016 | Slusar |
| 9,399,472 | B2 | 7/2016 | Minoiu-Enache |
| 9,463,805 | B2 | 10/2016 | Kirsch |
| 9,483,948 | B1 | 11/2016 | Gordon |
| 9,524,648 | B1 | 12/2016 | Gopalakrishnan |
| 9,547,309 | B2 * | 1/2017 | Ross ...................... G06Q 50/30 |
| 9,552,735 | B2 | 1/2017 | Pilutti |
| 9,566,958 | B2 | 2/2017 | Waldmann |
| 9,566,986 | B1 | 2/2017 | Gordon |
| 9,587,952 | B1 | 3/2017 | Slusar |
| 9,628,975 | B1 | 4/2017 | Watkins |
| 9,646,496 | B1 | 5/2017 | Miller |
| 9,718,468 | B2 | 8/2017 | Barfield, Jr. |
| 9,754,235 | B1 | 9/2017 | Padmanabhan |
| 9,791,861 | B2 | 10/2017 | Keohane |
| 9,834,224 | B2 | 12/2017 | Gordon |
| 10,042,359 | B1 | 8/2018 | Konrardy |
| 10,093,322 | B2 | 10/2018 | Gordon |
| 2002/0128774 | A1 | 9/2002 | Takezaki |
| 2003/0065572 | A1 | 4/2003 | McNee |
| 2003/0076981 | A1 | 4/2003 | Smith |
| 2004/0078133 | A1 | 4/2004 | Miller |
| 2004/0117086 | A1 | 6/2004 | Rao |
| 2004/0199306 | A1 | 10/2004 | Heilmann |
| 2005/0021227 | A1 | 1/2005 | Matsumoto |
| 2006/0163939 | A1 | 7/2006 | Kuramochi |
| 2006/0241855 | A1 | 10/2006 | Joe |
| 2007/0124027 | A1 | 5/2007 | Betzitza |
| 2007/0265754 | A1 | 11/2007 | Curtis |
| 2008/0048850 | A1 | 2/2008 | Yamada |
| 2008/0065293 | A1 | 3/2008 | Placke |
| 2008/0114663 | A1 | 5/2008 | Watkins |
| 2008/0129475 | A1 | 6/2008 | Breed |
| 2008/0201217 | A1 | 8/2008 | Bader |
| 2008/0288406 | A1 | 11/2008 | Seguin |
| 2009/0094109 | A1 | 4/2009 | Aaronson |
| 2009/0138168 | A1 | 5/2009 | Labuhn |
| 2009/0248231 | A1 | 10/2009 | Kamiya |
| 2010/0057511 | A1 | 3/2010 | Mansouri |
| 2010/0156672 | A1 | 6/2010 | Yoo |
| 2010/0179720 | A1 | 7/2010 | Lin |
| 2010/0228427 | A1 | 9/2010 | Anderson |
| 2010/0256852 | A1 | 10/2010 | Mudalige |
| 2011/0029173 | A1 | 2/2011 | Hyde |
| 2011/0035250 | A1 | 2/2011 | Finucan |
| 2011/0077807 | A1 | 3/2011 | Hyde |
| 2011/0137699 | A1 | 6/2011 | Ben-Ari |
| 2011/0264521 | A1 | 10/2011 | Straka |
| 2012/0072243 | A1 | 3/2012 | Collins |
| 2012/0083960 | A1 | 4/2012 | Zhu |
| 2012/0123646 | A1 | 5/2012 | Mantini |
| 2012/0139756 | A1 | 6/2012 | Djurkovic |
| 2012/0277947 | A1 | 11/2012 | Boehringer |
| 2012/0293341 | A1 | 11/2012 | Lin |
| 2013/0113634 | A1 | 5/2013 | Hutchinson |
| 2013/0132140 | A1 * | 5/2013 | Amin ..................... G06Q 40/12 705/7.13 |
| 2013/0144502 | A1 | 6/2013 | Shida |
| 2013/0231824 | A1 | 9/2013 | Wilson |
| 2013/0304513 | A1 | 11/2013 | Hyde |
| 2014/0032049 | A1 | 1/2014 | Moshchuk |
| 2014/0092332 | A1 | 4/2014 | Price |
| 2014/0095214 | A1 | 4/2014 | Mathe |
| 2014/0136414 | A1 | 5/2014 | Abhyanker |
| 2014/0164126 | A1 | 6/2014 | Nicholas |
| 2014/0195213 | A1 | 7/2014 | Kozloski |
| 2014/0201037 | A1 | 7/2014 | Mallawarachchi |
| 2014/0201126 | A1 | 7/2014 | Zadeh |
| 2014/0214260 | A1 | 7/2014 | Eckert |
| 2014/0222577 | A1 | 8/2014 | Abhyanker |
| 2014/0282967 | A1 | 9/2014 | Maguire |
| 2014/0297116 | A1 | 10/2014 | Anderson |
| 2014/0309806 | A1 | 10/2014 | Ricci |
| 2014/0316671 | A1 | 10/2014 | Okamoto |
| 2014/0324268 | A1 | 10/2014 | Montemerlo |
| 2014/0330479 | A1 | 11/2014 | Dolgov |
| 2015/0006005 | A1 | 1/2015 | Yu |
| 2015/0019259 | A1 | 1/2015 | Qureshi |
| 2015/0026092 | A1 | 1/2015 | Abboud |
| 2015/0035685 | A1 | 2/2015 | Strickland |
| 2015/0051778 | A1 | 2/2015 | Mueller |
| 2015/0057891 | A1 | 2/2015 | Mudalige |
| 2015/0062469 | A1 | 3/2015 | Fleury |
| 2015/0066282 | A1 | 3/2015 | Yopp |
| 2015/0088358 | A1 | 3/2015 | Yopp |

(56) References Cited

U.S. PATENT DOCUMENTS

| | | | |
|---|---|---|---|
| 2015/0095190 | A1 | 4/2015 | Hammad |
| 2015/0095198 | A1* | 4/2015 | Eramian ............ G06Q 30/0629 705/26.64 |
| 2015/0097866 | A1 | 4/2015 | Mochizuki |
| 2015/0120331 | A1 | 4/2015 | Russo |
| 2015/0134178 | A1 | 5/2015 | Minoiu-Enache |
| 2015/0136045 | A1 | 5/2015 | Shenoy |
| 2015/0137985 | A1 | 5/2015 | Zafiroglu |
| 2015/0141043 | A1 | 5/2015 | Abramson |
| 2015/0149018 | A1 | 5/2015 | Attard |
| 2015/0149021 | A1 | 5/2015 | Duncan |
| 2015/0160019 | A1 | 6/2015 | Biswal |
| 2015/0193724 | A1* | 7/2015 | Stevens ............... G06Q 10/083 705/330 |
| 2015/0242953 | A1 | 8/2015 | Suiter |
| 2015/0248689 | A1* | 9/2015 | Paul .................. G06Q 30/0222 705/14.23 |
| 2016/0090100 | A1 | 3/2016 | Oyama |
| 2016/0187150 | A1* | 6/2016 | Sherman ........ G06Q 10/063114 705/7.15 |
| 2016/0202700 | A1 | 7/2016 | Sprigg |
| 2016/0205146 | A1 | 7/2016 | Sugioka |
| 2016/0355192 | A1 | 12/2016 | James |
| 2016/0364823 | A1* | 12/2016 | Cao ....................... G06Q 50/30 |
| 2017/0001650 | A1 | 1/2017 | Park |
| 2017/0021837 | A1 | 1/2017 | Ebina |
| 2017/0057542 | A1 | 3/2017 | Kim |
| 2017/0106876 | A1 | 4/2017 | Gordon |
| 2017/0123428 | A1 | 5/2017 | Levinson |
| 2017/0132540 | A1* | 5/2017 | Haparnas ......... G06Q 10/06311 |

FOREIGN PATENT DOCUMENTS

| | | |
|---|---|---|
| CN | 202038228 U | 11/2011 |
| CN | 104900018 A | 9/2015 |
| EP | 0582236 B1 | 6/1998 |
| GB | 2498793 B | 7/2013 |
| WO | 2014058263 A1 | 4/2014 |
| WO | 2014147361 A1 | 9/2014 |
| WO | 2014148975 A1 | 9/2014 |
| WO | 2015024616 A1 | 2/2015 |
| WO | 2015056105 A1 | 4/2015 |
| WO | 2015156146 A1 | 10/2015 |

OTHER PUBLICATIONS

R. Vaidyanathan et al., "A Reflexive Vehicle Control Architecture Based on a Neural Model of the Cockroach Escape Response", Institution of Mechanical Engineers. Journal of Systems and Control Engineering, 2011, vol. 226, No. 5, pp. 699-718.

J. Miller, "Self-Driving Car Technology's Benefits, Potential Risks, and Solutions", The Energy Collective, theenergycollective.com, Aug. 19, 2014, pp. 1-7.

Chen S, et al., "A Crash Risk Assessment Model for Roas Curves". Inproceedings 20th International Technical Conference on the Enhanced Saftey of Vehicles., 2007. Lyon, France.

J. Wei et al., "Towards a Viable Autonomous Driving Research Platform", IEEE, Intelligent Vehicles Symposium (IV), 2013, pp. 1-8.

C. Berger et al., "Cots-Architecture With a Real-Time OS for a Self-Driving Miniature Vehicle", Safecomp 2013—Workshop ASCOMS of the 32nd International Conference on Computer Safety, Reliability and Security, Sep. 2013, Toulouse, France, pp. 1-13.

Anonymous, "Google Files Patent for Second-Gen Autonomous Vehicle Without a Steering Wheel, Brake Pedal & More". patentlymobile.com, Nov. 27, 2015. Web. Sep. 22, 2016. <http://www.patentlymobile.com/2015/11/GOOGLE-FILES-PATENT-FOR-SECOND-GEN-AUTONOMOUS-VEHICLE-WITHOUT-A-STEERING-WHEEL-BRAKE-PEDAL-MORE.HTML>.

Anonymous, "Avoiding Crashes With Self-Driving Cars: Today's Crash-Avoidance Systems Are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.

A. Hars, "Self-Driving Cars: the Digital Transformation of Mobility", Marktplatze Im Umbruch, Springer Berlin Heidelberg, 2015, pp. 539-549.

Brownell, "Shared Autonomous Taxi Networks: an Analysis of Transportation Demand in NJ and a 21st Century Solution for Congestion", Dissertation, Princeton University, 2013, pp. 1-122.

Sessa et al., "Blueprint of Alternative City Cyber-Mobility Take-U Scenarios", Seventh Framework Programme Theme SST.2012.3.1-4, Automated Urban Vehicles Collaborative Project—Grant Agreement No. 314190, 2013, pp. 1-63.

Lutin et al., "The Revolutionary Development of Self-Driving Vehicles and Implications for the Transportation Engineering Profession", ITE Journal 83.7, 2013, pp. 28-32.

Jimenez et al.; "Autonomous collision avoidance system based on accurate knowledge of the vehicle surroundings" Inst Engineering Technology-IET; IET Intelligent Transport Systems vol. 9, No. 1, pp. 105-117; 2015; England.

IBM, "Preliminary Statement Relative To Examination of Application", Mar. 2020.

* cited by examiner

DIRECTING MOVEMENT OF A SELF-DRIVING VEHICLE BASED ON SALES ACTIVITY

BACKGROUND

The present disclosure relates to the field of vehicles, and specifically to the field of self-driving vehicles. Still more specifically, the present disclosure relates to the field of controlling the movement of self-driving vehicles.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

A method controls a self-driving vehicle (SDV) based on a purchase transaction at a point of sale (POS) device. In an embodiment of the present invention, one or more processors detects a purchase transaction at the POS device for a product. In response to detecting the purchase transaction at the POS device, the processors(s) transmits instructions to the SDV to transport a passenger associated with the purchase transaction from a location of the POS device to a predetermined location.

In an embodiment of the present invention, the predetermined location is product location of the product, where the product location is remote from the location of the POS device.

In an embodiment of the present invention, the predetermined location is a predetermined staging area that is away from a current location of the product.

In an embodiment of the present invention, the method further includes: determining, by one or more processors, a product type of the product being purchased in the purchase transaction, wherein the product is a physical good that is to be transported from the predetermined location to a delivery location; associating, by one or more processors, the product type with a level of cleanliness of the SDV that is required to transport the product; and dispatching, by one or more processors, a type of SDV that is comports with the level of cleanliness to the predetermined location.

In an embodiment of the present invention, the method further includes: determining, by one or more processors, a product type of the product being purchased in the purchase transaction; associating, by one or more processors, the product type with a passenger type of a person who purchased the product in the purchase transaction; associating, by one or more processors, the passenger type with a type of SDV that is appropriate for transporting the passenger type associated with the product type of the product; and dispatching, by one or more processors, the type of SDV that is associated with the passenger type associated with the product type of the product to the predetermined location.

In one or more embodiments of the present invention, the method(s) described herein are implemented in a computer program product and/or a computer system.

2

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
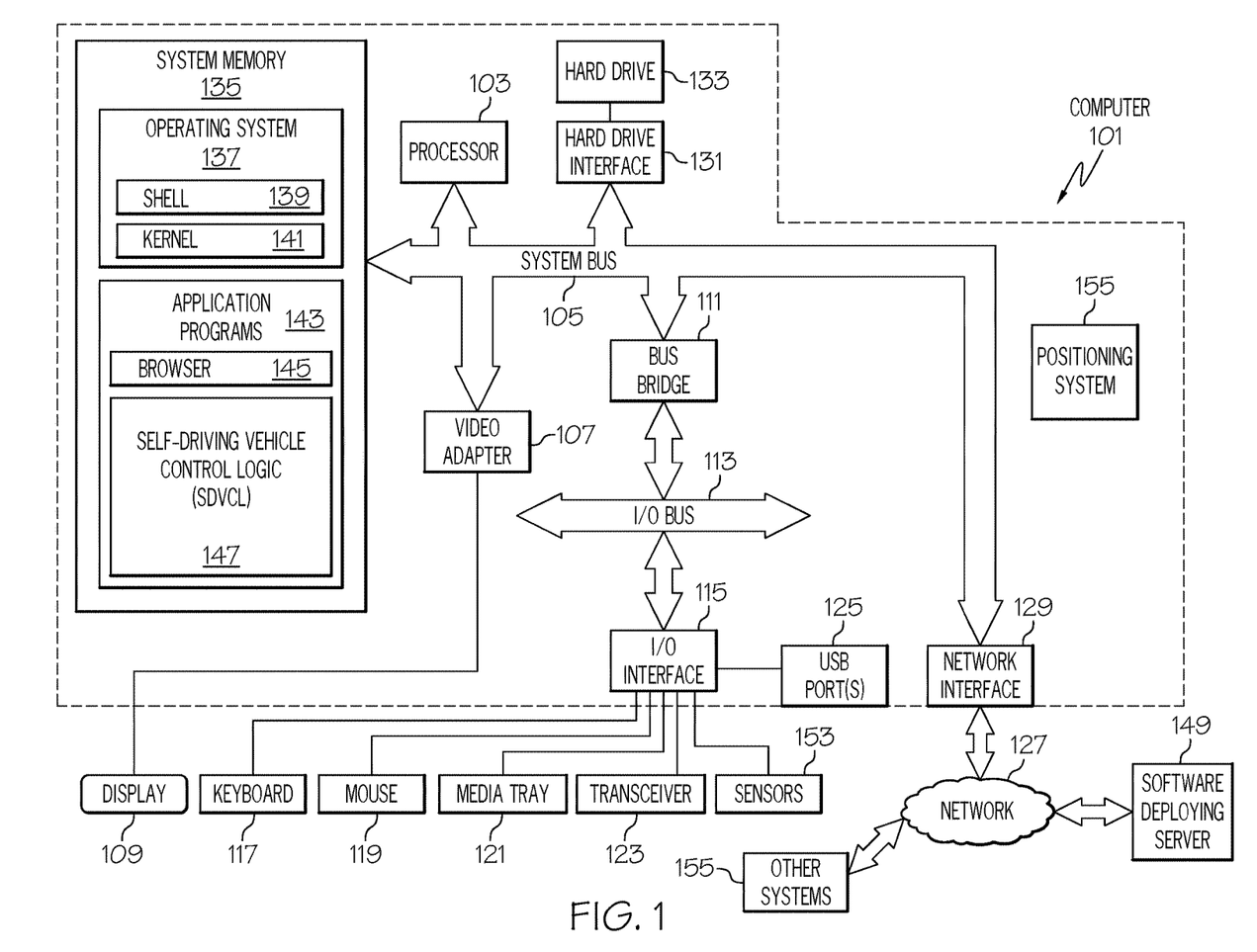
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or other systems 155 shown in FIG. 1, and/or controller 201 and/or point of sale (POS) local device 204 and/or POS remote device 208 shown in FIG. 2, and/or a self-driving vehicle (SDV) on-board computer 301 shown in FIG. 3, and/or a user device 401 shown in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other systems 155 (e.g., establishing communication among SDV 202, controller 201, POS local device 204, POS remote device 208, etc. as described and depicted in the figures herein) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143.

Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Self-Driving Vehicle Control Logic (SDVCL) 147. SDVCL 147 includes code for implementing the processes described below, including those described in FIGS. 2-5. In one embodiment, computer 101 is able to download SDVCL 147 from software deploying server 149, including in an on-demand basis, wherein the code in SDVCL 147 is not downloaded until needed for execution. In one embodiment of the present invention, software deploying server 149 performs all of the functions associated with the present invention (including execution of SDVCL 147), thus freeing computer 101 from having to use its own internal computing resources to execute SDVCL 147.

Also within computer 101 is a positioning system 151, which determines a real-time current location of computer 101 (particularly when part of a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101. More specifically, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles including erratically driven vehicles as described herein, road obstructions, pavement, etc.) of that SDV, thus enabling it to be autonomously self-driven. Similarly, sensors 153 may be cameras, thermometers, moisture detectors, etc. that detect ambient weather conditions and other environmental conditions of a roadway upon which the SDV is traveling.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
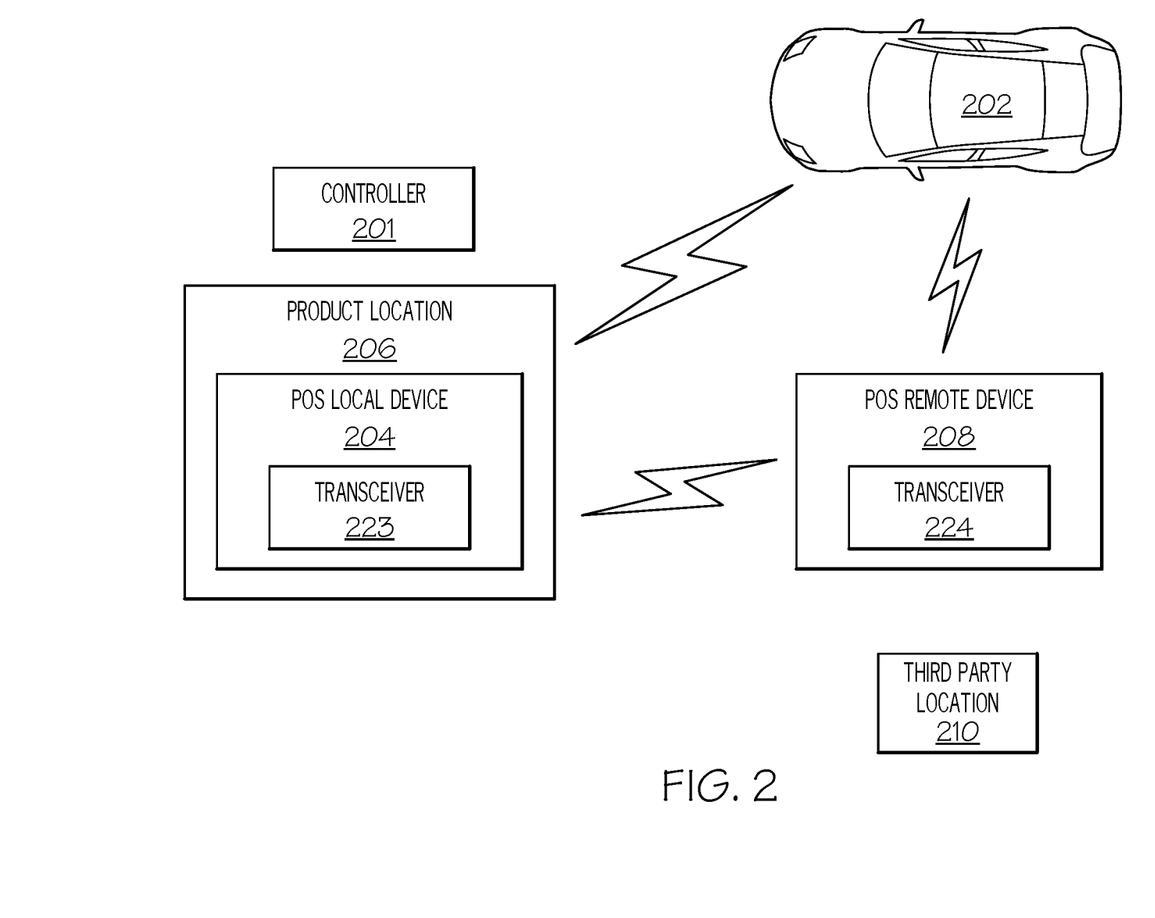
FIG. 2 illustrates a relationship between activities at a point of sale (POS) device and an exemplary self-driving vehicle (SDV) in accordance with one or more embodiments of the present invention.

With reference now to FIG. 2, a point of sale (POS) local device 204 is shown at a product location 206. POS local device 204 is an electronic cash register, a self-served kiosk device (e.g., an automated teller machine—ATM), or any other type of transaction device that is communicatively coupled to other devices, including but not limited to a controller 201, a self-driving vehicle 202, etc. Such communications preferably are wireless (e.g., via a combination of a cellular network and the Internet and interfaces therebetween).

In the context of the present invention, it is understood that product location 206 is any physical location where a product, including a good or a service, is provided. For example, product location 206 may be a clothing store, a shopping mall, a hardware store, a bank, a doctor's office, a hospital, a school, etc., each of which are locations at which a customer is able to obtain a good or service. However, for purposes of explanation, assume now that product location 206 is a hardware store.

Assume further (for illustrative purposes) that a customer at the hardware store has completed a purchase transaction at the POS local device 204, which is an electronic check-out terminal in the hardware store. That is, the customer has swiped his/her credit card or otherwise concluded a purchase at the hardware store using the POS local device 204. This causes a transceiver 223 associated with the POS local device 204 to transmit driving instructions to self-driving vehicle (SDV) 202 to autonomously drive to some predetermined location, such as the product location 206, in order to pick up the customer.

While these driving instructions are issued by the POS local device 204 in one or more embodiments of the present invention, in one or more other embodiments such driving instructions are issued by a third party device, such as a controller 201 that is monitoring activities of the POS local device 204 and/or other devices, such as one or more SDVs from a fleet of SDVs (including SDV 202), thereby coordinating which SDV is dispatched to the product location 206 or another location (e.g., third party location 210).

In one embodiment of the present invention, SDV 202 is owned and/or for the exclusive use of the customer who is concluding a transaction at POS local device 204. As such, SDV 202 and only SDV 202 will be dispatched to the product location 206 under directions issued by the POS local device 204 as described herein.

With regard to third party location 210, assume that the user of the POS local device 204 (e.g., a customer in the hardware store) has purchased a product (e.g., a power saw), but would like for another person to actually pick it up (e.g., in order to let that other person approve the size, weight, power, etc. of the power saw). As such, the POS local device 204 and/or controller 201 can direct the SDV 202 to proceed first to the third party location 210, in order to pick up that other person at the third party location 210 and then to take that other person to the hardware store (product location 206).

While the transaction device used to prompt the movement of the SDV 202 may be the POS local device 204 at the product location 206 (e.g., a check-out terminal at the hardware store), in one embodiment the transaction device/terminal is a remote device. For example, assume that POS remote device 208 is a check-out terminal that is actually a laptop computer that a customer is using from his/her home to order a product (e.g., the power saw) from the product location 206 (e.g., the hardware store). Thus, the "point of sale" is actually the customer's home, and the POS terminal (POS remote device 208) is the shopper's laptop. As such, the transceiver 224 associated with the laptop computer (POS remote device 208) transmits an instruction to SDV 202 to come to the customer's home (i.e., the physical location of the POS remote device 208), in order to take the customer from the customer's home to the hardware store (product location 206) in order to pick up the power saw that he/she just ordered.

Figure 3:
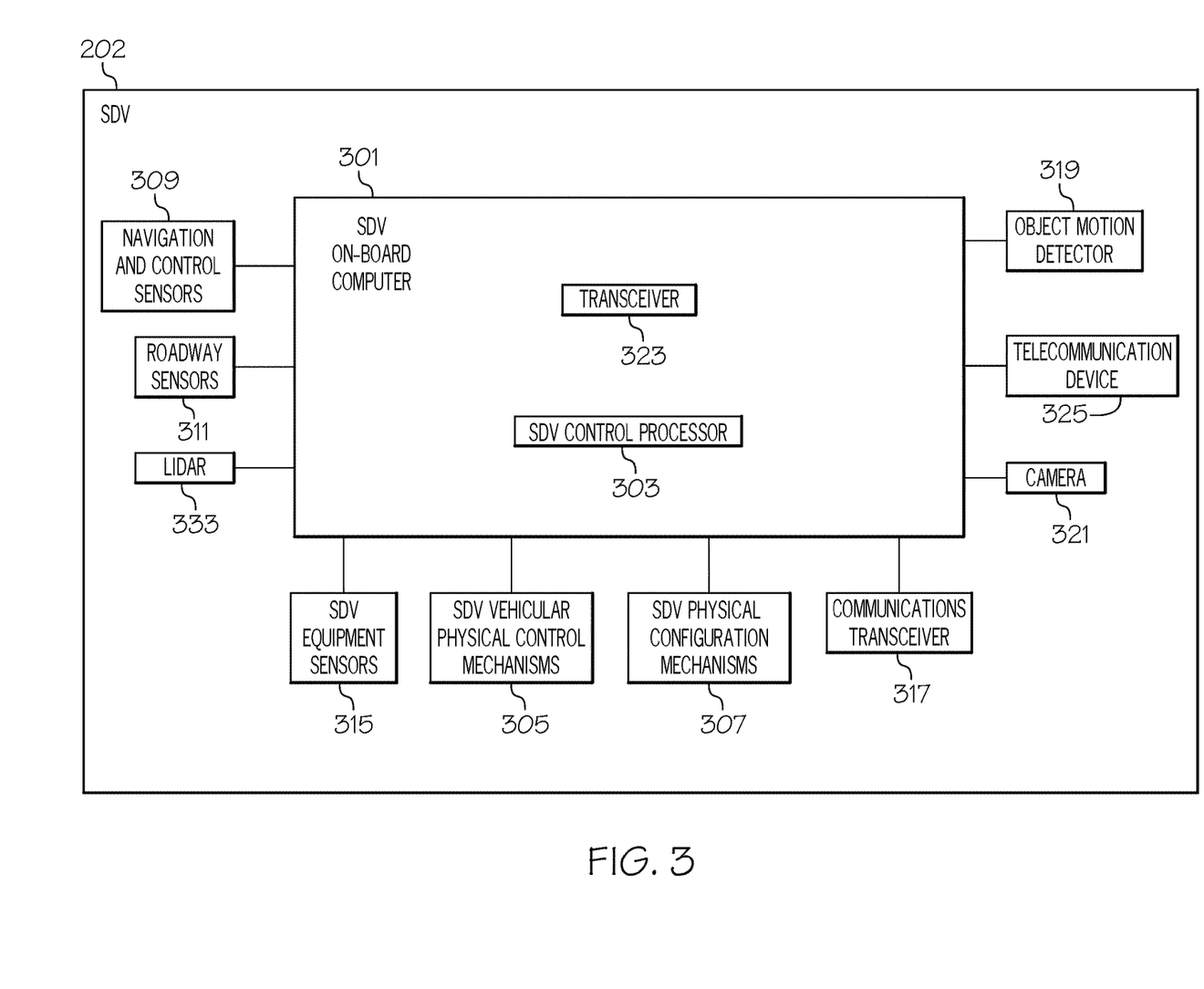
FIG. 3 depicts additional detail of hardware within an SDV.

With reference now to FIG. 3, additional detail of components within SDV 202 are presented. As shown in FIG. 3, SDV 202 has an SDV on-board computer 301 that controls operations of the SDV 202. While in autonomous mode, SDV 202 operates without the input of a human driver, such that the engine, steering mechanism, braking system, horn, signals, etc. are controlled by the SDV control processor 303, which is under the control of the SDV on-board computer 301. That is, by the SDV on-board computer 301 processing driving instructions received by a communications transceiver 317 and inputs taken from navigation and control sensors 309, then the SDV 202 is able to autonomously drive to the product location 206 shown in FIG. 2 or any other location at a time dictated by such driving instructions.

Thus, communications transceiver 317 is able to receive and transmit electronic communication signals (e.g., RF messages) from and to other communications transceivers found in other vehicles, servers, monitoring systems, etc. This enables SDV control processor 303 to autonomously control SDV vehicular physical control mechanisms 305 (e.g., the engine throttle, steering mechanisms, braking systems, turn signals, etc.).

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., the same transceiver 323 that emitted the electromagnetic radiation). An exemplary positioning system within SDV 202 is a Light Detection and Ranging (LIDAR) (e.g., the depicted LIDAR 333) or Laser Detection and Ranging (LADAR) system that measures the time it takes to receive back the emitted electromagnetic radiation (e.g., light), and/or evaluate a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

In one or more embodiments of the present invention, SDV 202 includes roadway sensors 311 that are coupled to the SDV 202. Roadway sensors 311 may include sensors that are able to detect the amount of water, snow, ice, etc. on a roadway (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc. Roadway sensors 311 may also include sensors that are also able to detect how dark the roadway is using light sensors.

Similarly, a dedicated camera 321 can be trained on an area around SDV 202, in order to recognize (e.g., the SDV on-board computer 301 using facial recognition that plots and matches points on a waiting person's face with plotted points for known persons), in order to pull up to the waiting customer who just completed the purchase transaction described above.

Similarly, a dedicated object motion detector 319 (e.g., a radar transceiver capable of detecting Doppler shifts indicative of the speed and direction of movement of hand waving by the waiting customer) can be trained on the area around the area (e.g., product location 206) in which the customer/passenger is waiting.

In one or more embodiments of the present invention, also within the SDV 202 are SDV equipment sensors 315. SDV equipment sensors 315 may include cameras aimed at tires on the SDV 202 to detect how much tread is left on the tire. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc. Such measurements are used in one or more embodiments of the present invention to determine whether a particular SDV is the appropriate SDV for picking up the customer. That is, if the SDV is in poor condition and the customer has just purchases a fragile or perishable good, then that SDV would be a poor candidate to dispatch to that customer (who must have an uninterrupted trip to his/her destination).

Figure 4:
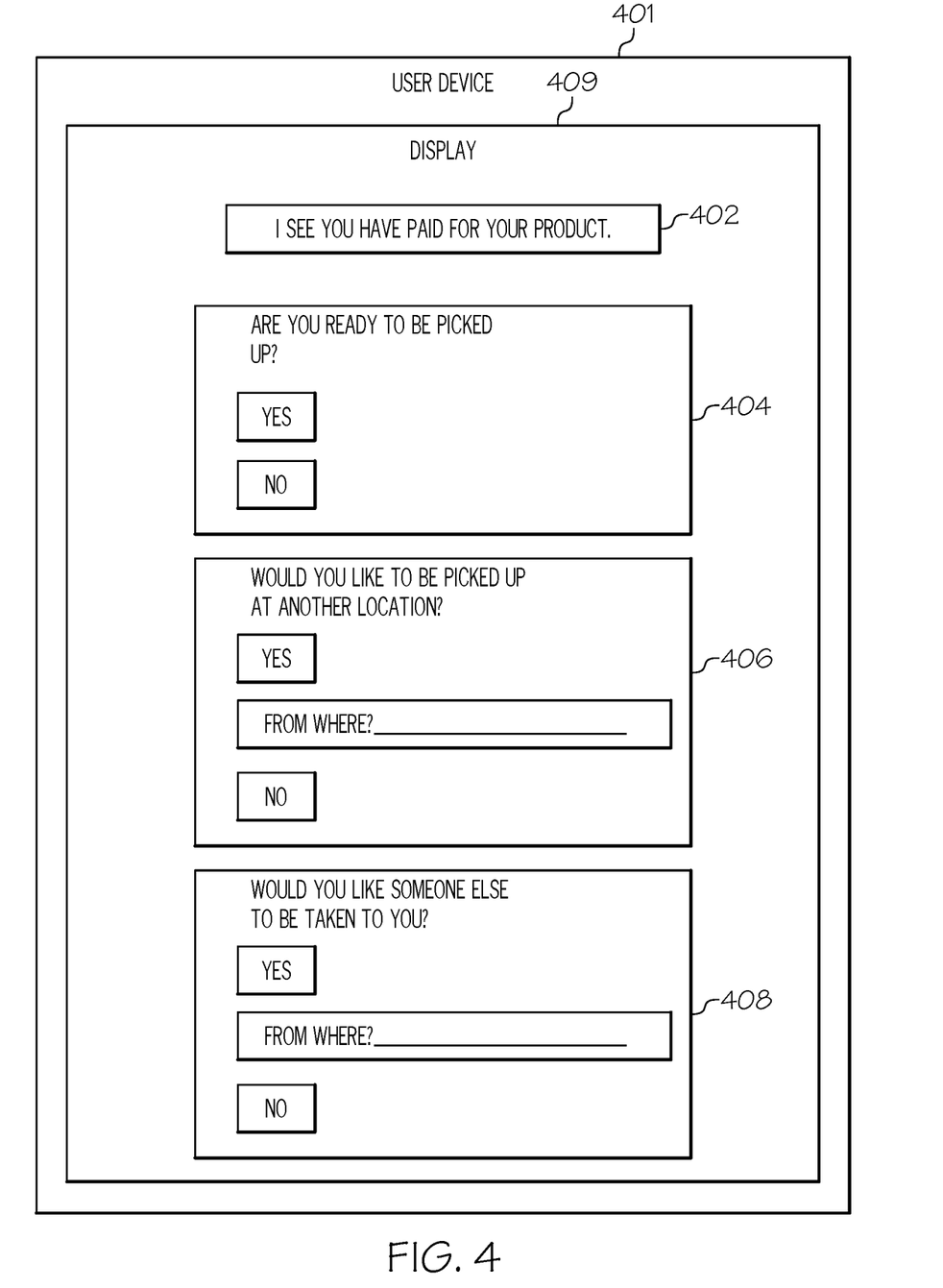
FIG. 4 illustrates an exemplary user interface on a user device for a person who utilizes the POS depicted device in FIG. 2.

In one or more embodiments of the present invention, also within SDV 202 is a telecommunication device 325, which is able to send messages to a telecommunication device (e.g., a smart phone such as the user device 401 shown in FIG. 4).

In one or more embodiments of the present invention, SDV 202 also includes SDV physical configuration mechanisms 307, which are under the control of the SDV on-board computer 301. Examples of SDV physical configuration mechanisms 307 are mechanisms that control seating configurations, doors being opened, trunks being opened, etc. For example, assume that communications transceiver 317 has received a signal from POS local device 204 indicating that the customer/passenger has just purchased three boxes of insulation from the hardware store (product location 206). As such, when SDV 202 pulls up to the hardware store to pick up the passenger, it will have the trunk already open, in order to allow the passenger to place the large and bulky boxes of insulation into the trunk before getting into SDV 202.

In a preferred embodiment, the instructions to the SDV 202 to drive to the predetermined location (e.g., product location) are performed without any user input. That is, as soon as the POS local device 204 and/or controller 201 shown in FIG. 2 detect that the customer has completed the purchase transaction at the POS local device 204, then the POS local device 204 and/or controller 201 automatically send an instruction to the SDV 202 to come to the product location 206 in order to pick up the waiting customer. However, in an alternate embodiment, the user is able to have an input into the process.

For example, consider the display 409 on the user device 401 (e.g., a smart phone) shown in FIG. 4. Display 409 acknowledges that the customer has completed the purchase transaction, as indicated in field 402. However, in one embodiment, the customer is given the option to acknowledge whether or not he/she is actually ready to be picked up by SDV 202, as indicated by the option boxes ("YES" or "NO") shown in field 404. Thus, if the customer taps "NO" in field 404, then the display 409 will provide other options (e.g., times or places, as suggested by field 406), at which the customer would like to be picked up.

Similarly, field 408 gives the customer the option of having the SDV 202 pick up another party (e.g., from the third party location 210 shown in FIG. 2) and take that other party to the product location 206 at which the purchase transaction occurred.

Note that in a preferred embodiment of the present invention, the initiating event of such options shown in FIG. 4 is the completion of the purchase transaction at the POS terminal (e.g., POS local device 204).

Figure 5:
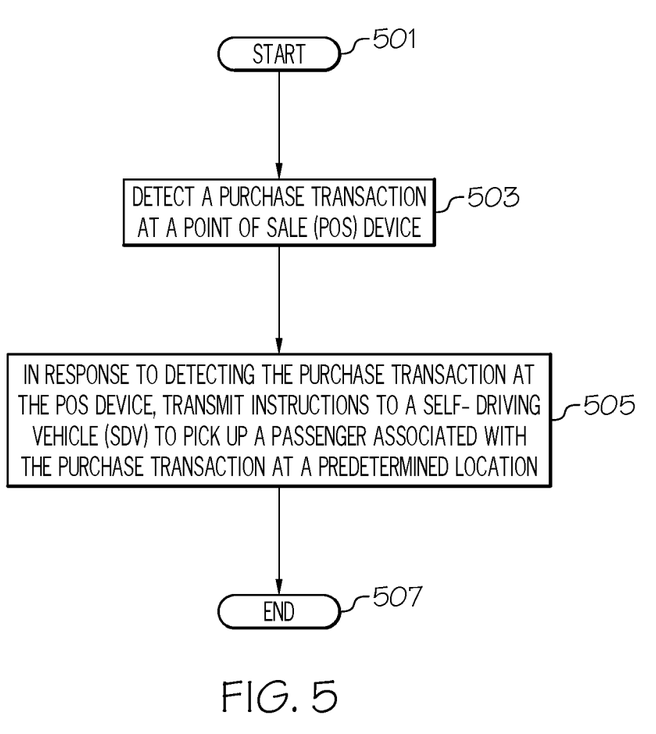
FIG. 5 is a high-level flow chart of one or more steps performed by one or more processors and/or other hardware devices to control movement of an SDV in response to activity at a POS device.

With reference now to FIG. 5, a high-level flow chart of one or more steps performed by one or more processors to control the movement of a self-driving vehicle (SDV) in response to a purchase transaction at a POS device is presented.

After initiator block 501, one or more processors (e.g., within POS local device 204 and/or controller 201 shown in FIG. 2) detect a purchase transaction at a point of sale (POS) device (e.g., POS local device 204), as described in block 503 of FIG. 5.

As described in block 505 in FIG. 5, in response to detecting the purchase transaction at the POS device, the processor(s) (e.g., in POS local device 204 and/or controller 201) transmit instructions to (the SDV on-board computer 301 within) a self-driving vehicle (SDV) such as SDV 202, directing SDV 202 to pick up a passenger associated with the purchase transaction at a predetermined location. That is, the passenger may be a customer who actually performed (i.e., completed) the purchase transaction on the POS device, or it may be a third party, as described herein.

The flow-chart ends at terminator block 507.

As described in FIG. 2, in one embodiment of the present invention the POS device (e.g., POS local device 204) is located at a product location (e.g., product location 206) of a product being purchased by the purchase transaction. Thus, the predetermined location to which the SDV 202 is being directed may be the product location. In a preferred embodiment, this "product location" to which the SDV 202 is directed (by the POS local device 204) to drive to is predetermined by the POS local device 204 and/or the customer. That is, the POS local device 204 will use a predetermined location to which all SDVs are directed for customer pickup (e.g., a customer loading area at a store, a main entrance to a mall, etc.). In one embodiment, this particular location can be selected by the customer from a set of customer pickup locations at the store/mall/etc.

Alternatively, the predetermined location to which the SDV 202 is being directed may be a predetermined staging area that is away from the product location. That is, this staging area may be a loading dock, a loading area, a passenger waiting area, etc.

In one embodiment of the present invention, the passenger being picked up by SDV 202 is the person who actually performed the purchase transaction at the POS device located at the product location (i.e., the person who paid for the product). In another embodiment, however, the passenger being picked up by SDV 202 is another person (who did not perform the purchase transaction at the POS device located at the product location), such as a child, friend, etc. of the person who actually paid for the product.

As described in FIG. 2, in one embodiment of the present invention, the POS device is not located at the product location 206, but rather is located at a remote location that is remote from product location 206. That is, the POS device may be a laptop or other device used at a different location, such as the POS remote device 208 shown in FIG. 2. Nonetheless, completing the purchase using the POS remote device 208 can still invoke movement of the SDV 202 towards the product location 206 and/or some other location (e.g., third party location 210). Thus as described herein, the remote location (e.g., third party location 210 or the physical location of the POS remote device 208) is the predetermined location, and instructions to SDV 202 direct SDV 202 to transport a person passenger from that remote location to the product location.

In an embodiment of the present invention, one or more processors (e.g., within POS local device 204, controller 201, and/or POS remote device 208) transmit to SDV 202 routing directions to the predetermined location (e.g., product location 206). Such routing instructions can be based on known routes stored in the processor(s), but can be modified according to current traffic conditions and road conditions and SDV conditions (received by the processor(s) within the SDV 202).

In an embodiment of the present invention, one or more processors (e.g., within POS local device 204, controller 201, and/or POS remote device 208) determine a product type of a product being purchased in the purchase transaction. The processor(s) associate the product type with a passenger type of the person who purchased the product in the purchase transaction, and then associate the passenger type with a type of SDV that is appropriate for transporting the passenger type who purchased the product type of product. The processor(s) then dispatch the type of SDV that is associated with the passenger type who purchased the product type of product to the predetermined location. For example, assume that a customer just purchased four bags of fertilizer. As such, this type of customer is unlikely to be very concerned about how comfortable (or even clean) the SDV that is picking him/her up is. However, if the customer just purchased a piece of clothing that cost thousands of dollars, then that customer is more likely interested in being picked up by an SDV that is more luxurious and clean. As such, the controller 201 and/or POS terminal will call the appropriate SDV based on the customer's purchases.

In an embodiment of the present invention, the type of SDV being called by the POS local device 204 depends not upon the type of product being purchased per se, but rather the style (e.g., formality) of the product location 206. For example, assume that product location 206 is a restaurant. If the restaurant is a high-end (expensive) restaurant, then the SDV 202 being called by the POS local device 204 is selected from a pool of luxurious (and likely more expensive to use) SDVs. However, if the restaurant is a low-end (inexpensive) fast food restaurant, then the SDV 202 being called by the POS local device 204 is selected from a pool of more modest (and likely cheaper to use) SDVs.

In an embodiment of the present invention, the controller 201 and/or SDV 202 will send the POS device (e.g., POS local device 204 shown in FIG. 2) and/or the user device 401 (shown in FIG. 4) a message indicating an estimated arrival time of SDV 202 at the predetermined location (e.g., product location 206). This estimated arrival time is calculated by processors on SDV 202 and/or controller 201 based on a distance to the predetermined location, current traffic and weather conditions, etc.

In one embodiment, the estimated arrival time is used as a time frame for which the SDV 202 is available to the customer/shopper. That is, if the user of the POS local device 204 does not enter SDV 202 during the estimated arrival time, then the SDV 202 will leave the product location 206. For example, assume that the estimated arrival time is 1:00 PM. The SDV 202 will be at the product location 206 (e.g., the hardware store, the restaurant, etc.) from 12:55 PM until 1:05 PM. If the user of the POS local device 204 does not get into SDV 202 within that time window, then SDV 202 will leave the product location 206. This SDV movement prevents 1) SDV congestion at the product location 206, and 2) an unauthorized passenger from entering SDV 202.

In an embodiment of the present invention, one or more processors (e.g., within SDV 202) determine a type of product being purchased in the purchase transaction (e.g., based on information received from the POS terminal/device). The processor(s) then transmit instructions to autonomously adjust a physical configuration of the SDV according to the type of product being purchased in the purchase transaction. In an example, the communications transceiver 317 in SDV 202 has received information (e.g., from transceiver 223 in POS local device 204) indicating that the customer has just purchased four large bundles of insulation. The SDV physical configuration mechanisms 307 shown in FIG. 3 then not only opens the side doors of the SDV to allow the customer to load these bundles into SDV 202, but also engages electromechanical devices to fold down seats within SDV 202 (even before arriving at the customer's location), thus providing additional unobstructed cargo space within SDV 202.

Thus, described herein is a method, system, and/or computer program product that enables a self-driving vehicle (SDV), such as a self-driving car (SDC) or any other type of autonomously-controlled passenger carrying vehicle (e.g., a cart, boat, etc.), to receive a signal from a point-of-sale (POS) device such as a POS terminal and then, based on receiving the signal, the SDC automatically drives to a useful pickup location for a passenger. For example, the point-of-sale device may be a credit-card reader at a restaurant, that is activated when a diner's card is swiped or the diner signs his/her name. Optionally, the SDC may send a signal to the POS device to indicate an estimated arrival time for passenger pickup.

Thus, the present invention provides a new and useful technological improvement that enables an SDC to be configured to detect when a customer has paid for his/her shopping items, dinner, doctor's appointment, etc. using a POS terminal that reads a credit card, and then directs the SDC to automatically drive to the door of the establishment to transport that customer and his/her purchased items.

That is, the presently disclosed invention includes an SDC (self-driving car or vehicle) that receives a signal from a point-of-sale (POS) device, and based on receiving that signal, the SDC automatically drives to a useful pickup location for a passenger.

The passenger pickup location may be within a radius R of a store/restaurant/train station exit area.

In one preferred embodiment, the SDC is configured to drop a passenger at the entrance to the store, mall or restaurant. The SDC then parks itself at a location some distance away from the establishment. Upon completion of a purchase (at the POS terminal) inside the establishment, a signal is sent automatically to the SDC, and the vehicle returns to the drop off location. Optionally, the SDC can communicate the pickup location to the passenger via a wireless connection to a smart device (e.g., via a text message, a photograph identifying landmarks, etc.).

As described herein, one embodiment also allows the customer to override the call to the SDC/SDV. Thus, if the purchase is preliminary or if additional purchases will be made from the same location, as in the case of a mall, then the customer will not be ready to be picked up by the SDV, and the customer can override the call to the SDV (see FIG. 4).

In addition to providing support for an independent user, the current invention also supports a dependent user (e.g., a child or a person who is unfamiliar with an environment). For example, a first independent user (e.g., a parent) can order a meal at a given establishment (e.g., a restaurant) for the second dependent user (e.g., their child). Then, when the meal is ready at the given establishment, the current invention calls/provides the SDC to take the dependent user to the establishment, where he/she can either eat or pick up the meal. Likewise, in one or more embodiments the SDV then brings the dependent user back when appropriate. In one embodiment, the SDV/SDC sends a message to the independent user (e.g., the parent) informing them that the dependent user was delivered safely to the programmed location.

As described herein, the SDC/SDV may send a signal to the POS device or another user device (e.g., a smart phone) to indicate an estimated arrival time for passenger pickup. As described herein, however, the shopper/diner/customer may be given the option of declining the SDV pickup at that estimated arrival time.

In one or more embodiments described herein, the system may "steer" the SDC to a special auto valet parking spot (e.g., near the entrance to a restaurant, hardware store, hospital, train station, etc.). In this case, a parking slot of a target vehicle among a plurality of slots formed in a parking place is determined based on situation information on the parking place and a movement path based on information on the current location of the target vehicle. The target vehicle is automatically parked in the determined convenient valet parking slot by moving along the movement path. That is, multiple SDVs are positioned in the SDV parking lot based on when they will be needed, their urgency (e.g., SDVs being dispatched for medical emergencies are given parking space priority to SDVs being dispatched to shoppers), etc.

As described in one or more embodiments herein, the SDC is programmed to meet the passenger at a different location depending on what was purchased. For instance, not only might a different SDC be required for a small sized purchase versus a large sized purchase, but the pickup location for the large items might be at a different physical location around the perimeter of the store. The steering instructions to the SDV/SDC are created by processors in automated fashion, based on an automated assessment of objects purchased, size of objects, etc.

In one or more embodiments of the present invention, the SDC sends a signal containing information on the location of the SDC, the temperature inside the SDC, SDC characteristics to the user's smartphone (or even the POS device) in order to indicate a preferred route to the pickup location.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
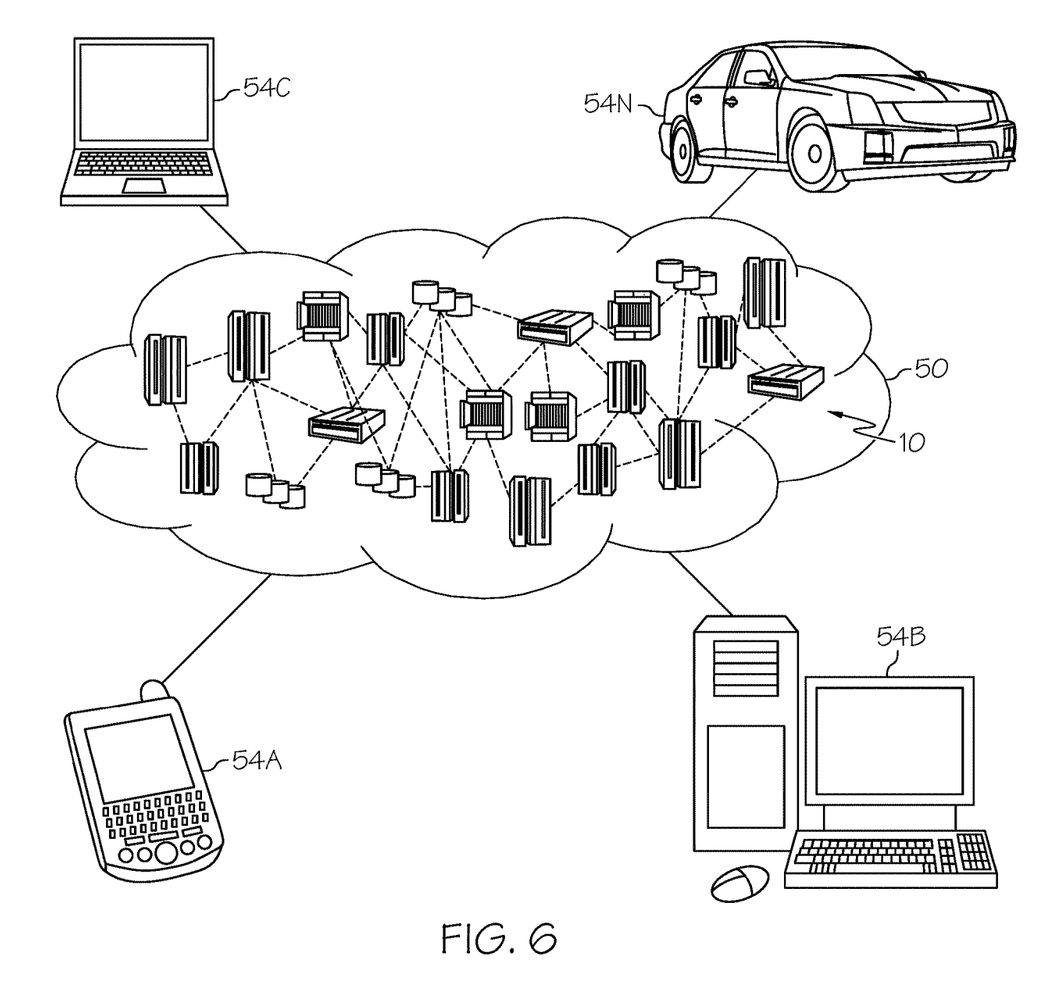
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
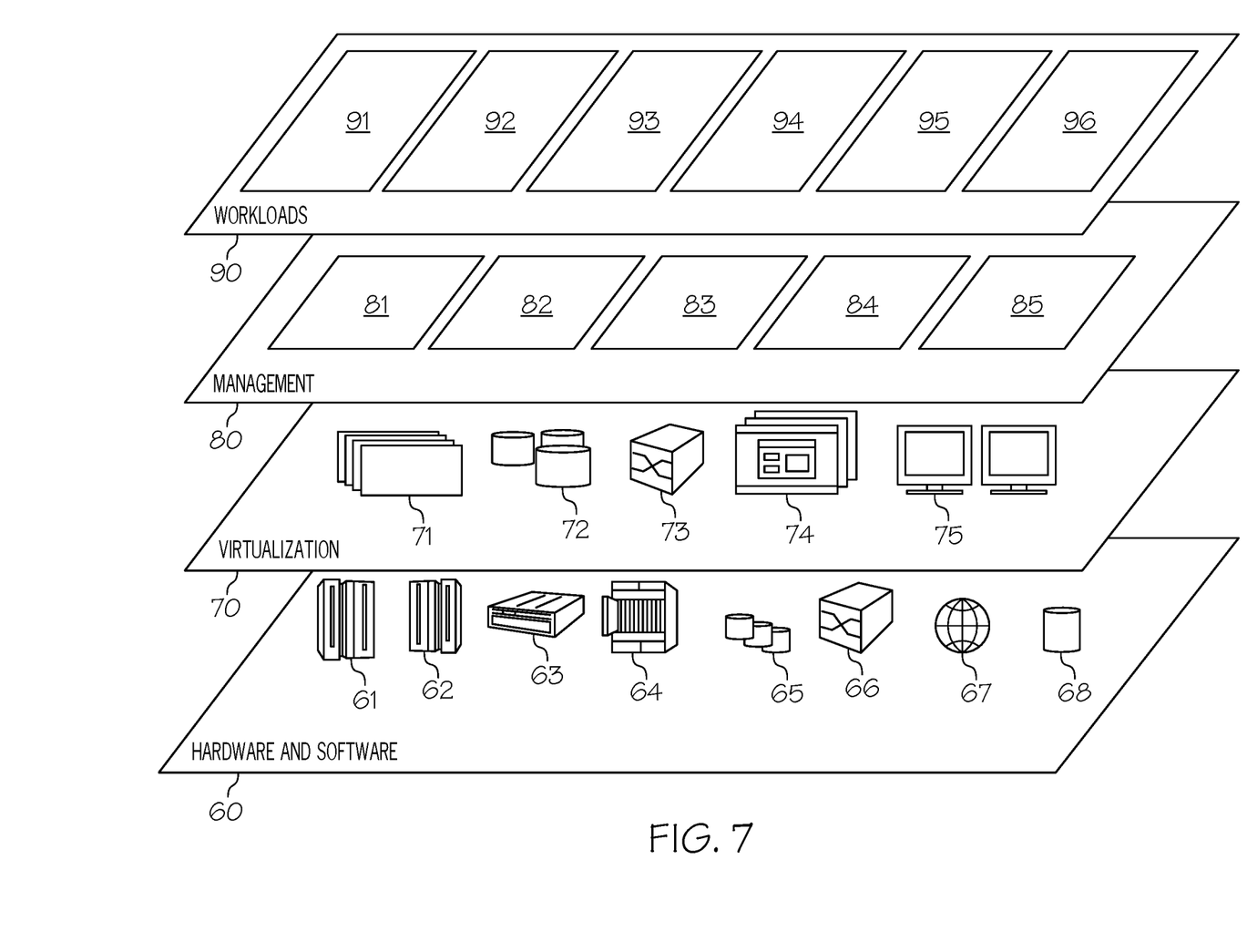
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle (SDV) control processing 96, which performs one or more of the processes described herein to direct an SDV to a predetermined location in response to a POS transaction.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   detecting, by one or more processors, a purchase transaction at a point of sale (POS) device for a product;
   determining, by one or more processors, a product type of the product being purchased in the purchase transaction, wherein the product is a physical good that is to be transported from a predetermined location to a delivery location;
   associating, by one or more processors, the product type with a level of interior cleanliness of a vehicle that is required to transport the product;
   determining, by one or more processors, that a self-driving vehicle (SDV) comports with the level of interior cleanliness;
   in response to determining that the SDV comports with the level of interior cleanliness, transmitting, by one or more processors, instructions to the SDV to transport a passenger associated with the purchase transaction from a location of the POS device to the predetermined location.

2. The method of claim 1, wherein the passenger is a person who did not perform the purchase transaction at the POS device.

3. The method of claim 1, wherein the predetermined location is product location of the product, wherein the product location is remote from the location of the POS device.

4. A computer program product comprising a computer readable storage medium having program code embodied therewith, wherein the computer readable storage medium is not a transitory signal per se, and wherein the program code is readable and executable by a processor to perform a method comprising:
- detecting a purchase transaction at a point of sale (POS) device for a product;
- determining a product type of the product being purchased in the purchase transaction, wherein the product is a physical good that is to be transported from a location of the POS device to a delivery location;
- associating the product type with a level of interior cleanliness of a self-driving vehicle (SDV) to be dispatched to the location of the POS device for pickup of the product; and
- dispatching an SDV that comports with the level of interior cleanliness to the location of the POS device for delivery of the product to the delivery location.

5. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
- detecting a purchase transaction at a point of sale (POS) device for a product;
- determining a product type of the product being purchased in the purchase transaction, wherein the product is a physical good that is to be transported from a location of the POS device to a delivery location;
- associating the product type with a level of interior cleanliness of a self-driving vehicle (SDV) to be dispatched to the location of the POS device for pickup of the product; and
- dispatching an SDV that comports with the level of interior cleanliness to the location of the POS device for delivery of the product to the delivery location.

\* \* \* \* \*